United States Patent [19]

Harriman, Jr. et al.

[11] Patent Number: 5,442,750
[45] Date of Patent: Aug. 15, 1995

[54] SYSTEM FOR TRANSMITTING DATA BETWEEN SYSTEMS USING SELECTED SUBSETS OF PLURAL INTERCONNECTING BUS LINES AND INCLUDING SELECTION OF A COMPATIBLE TRANSMISSION SPEED

[75] Inventors: Edward S. Harriman, Jr., Billerica, Mass.; Heather D. MacDonald Achilles, Hudson, N.H.

[73] Assignee: Wellfleet Communications, Bedford, Mass.

[21] Appl. No.: 161,208

[22] Filed: Dec. 2, 1993

Related U.S. Application Data

[63] Continuation of Ser. No. 771,743, Oct. 4, 1991, abandoned.

[51] Int. Cl.⁶ .................. G06F 13/40; G06F 13/42
[52] U.S. Cl. .................. 395/200 B; 370/85.9; 395/308; 395/200.15
[58] Field of Search .......... 370/60, 94.1, 54, 85.9; 395/800, 200

[56] References Cited

U.S. PATENT DOCUMENTS

| | | | |
|---|---|---|---|
| 4,228,496 | 10/1980 | Katzman et al. | 395/200 |
| 4,340,775 | 7/1982 | Geset et al. | 178/3 |
| 4,539,637 | 9/1985 | De Bruler | 395/650 |
| 4,577,312 | 3/1986 | Nash | 370/84 |
| 4,584,679 | 4/1986 | Livingston et al. | 370/85.9 |
| 4,598,400 | 7/1986 | Hillis | 370/60 |
| 4,703,475 | 10/1987 | Dretzka et al. | 370/60 |
| 4,805,169 | 2/1989 | Van Asselt | 370/58.2 |
| 4,885,738 | 12/1989 | Bowers et al. | 370/58.1 |
| 4,918,689 | 4/1990 | Hui | 370/85.9 |
| 4,933,838 | 6/1990 | Elrod | 395/575 |
| 5,109,490 | 4/1992 | Arimilli et al. | 395/325 |
| 5,301,303 | 4/1994 | Abraham et al. | 395/500 |

*Primary Examiner*—Parshotam S. Lall
*Assistant Examiner*—Richard L. Ellis
*Attorney, Agent, or Firm*—Fish & Richardson

[57] ABSTRACT

A method and apparatus for transmitting data between nodes connected to a communications bus, preferably a computer backbone, divides a full bus width into a plurality of sub-buses. Each sub-bus can be independently operated, and each node on the network can connect to one or more of the sub-buses. The apparatus provides, at a transmitting node, a determination of which sub-buses are available to transmit a data packet to one or more receiving nodes. The data words are divided into sub-words, thereby reducing the memory access time requirements and saving memory costs. In accordance with a particular embodiment, the header, at the beginning of the data packet, and the error check control, provided at the end of the data packet, are sent at a slower speed than the data information portion of the packet. The data information portion of the packet is sent at the highest speed compatible with the receiving node or nodes. In case one sub-bus fails, a node can transmit data over the other sub-buses available to it.

23 Claims, 6 Drawing Sheets

SYSTEM FOR TRANSMITTING DATA BETWEEN SYSTEMS USING SELECTED SUBSETS OF PLURAL INTERCONNECTING BUS LINES AND INCLUDING SELECTION OF A COMPATIBLE TRANSMISSION SPEED

This is a continuation of application Ser. No. 07/771,743, filed Oct. 4, 1991, now abandoned.

BACKGROUND OF THE INVENTION

The invention relates generally to data packet communications systems, and more particularly to a method and apparatus for transmitting data on a wide, high speed data bus.

As the available data transmission speed of networks increases, the hardware connecting to those networks must similarly increase in speed, Thus, hardware connected to a 16 megabit per second bus runs substantially more slowly than that hardware connected to a 100 megabit per second bus. Since the slower hardware is less expensive than the faster hardware, a hidden, and not insubstantial cost of increasing bus throughput is the price of the processing hardware to which it is connected.

The hardware costs of the bus transmitter/receiver circuitries include not only the particular drivers connected to the bus, but the memories, logic gates, etc. which also need to operate more quickly to properly use the faster bus. In particular, memory access requirements increase in direct proportion to the bus speed. The added cost of faster memory is especially burdensome.

The typical response to increased bus throughput, however, has and continues to be faster hardware. That faster hardware includes also faster control logic and processors and increases the cost of the entire network connection circuitry. To date, no alternative has been available to control network board costs while still operating a higher speed bus at its full capacity.

It is therefore an object of the invention to provide alternative circuit configurations for using high speed buses while controlling connection costs and memory costs. Other objects of the invention are a method and apparatus having high reliability, simplicity of structure, and redundancy in circuit use.

SUMMARY OF THE INVENTION

The invention thus relates to a method and apparatus for transmitting data between nodes connected to a communications bus where the bus width is at least equal to the number of bits in a data word to be transmitted on the bus. The method features the steps of connecting each node to the communications bus over at least one subset of bus lines, the combination of the subsets of bus lines including the entire bus. The method further features determining, at a transmitting node, those bus subsets over which the transmitting node can communicate with an intended destination node, and sending each data word to the destination node as a sequence of subwords over a bus subset selected from those determined bus subsets.

The method, in a particular embodiment, further features appending, as a header to the data words, a sequence of destination node identification symbols, and appending at the end of the sequence of data words, error checking information data for checking, at the destination node, the accuracy of the received data words.

In another aspect, the method features sending, from the destination node, and during a data transmission, a flow control signal for informing or warning the transmitting source node of an overflow error condition occurring at the destination node. The method can further feature selecting, at the transmitting node, a speed at which to send the data words and ensuring that all header information is sent at a slow bus speed which can be read by all nodes connected to the selected bus subset. In addition, the error checking information data can also be sent at the slow bus speed, to provide the destination node with the time required to check the error checking information data to ensure accuracy of transmission.

The apparatus of the invention relates to transmitting data between nodes connected to a communications bus, the bus having a bus width at least equal to the data words to be transmitted. The apparatus features circuitry for connecting each node to the communications bus over at least one subset of bus lines, hereafter called a sub-bus, a combination of the sub-buses covering, collectively, the entire communications bus. The apparatus further features circuitry for determining, at a transmitting node, those sub-buses over which the transmitting node can communicate with an intended destination node, and further, circuitry for sending each data word as a time sequence of subwords over a sub-bus selected from those determined acceptable sub-buses.

In preferred embodiments of the invention, the apparatus further features circuitry for appending a header to the beginning of the sequence of data words, the header including destination node identification symbols, and circuitry for appending at the end of the sequence of data words for a packet, an error checking information data for enabling the destination node to check the accuracy of the received data words. Circuitry also can be provided for sending from the destination node, during a data transmission, an overflow warning signal for informing the transmitting node of for example, an overflow error condition at the destination node.

The apparatus can further feature circuitry which selects a speed at which to send the data words but, however, which sends all header information, and preferably the error checking information data, at a slow bus speed which can be read by all nodes connected to the sub-bus. With regard to the error checking information data, the slower speed enables the destination node to perform error checking in real time since the error checking method is a substantially time consuming process.

BRIEF DESCRIPTION OF THE DRAWINGS

Other objects, features, and advantages of the invention will be apparent from the following description, taken together with the drawings, in which.

DESCRIPTION OF A PREFERRED EMBODIMENT

Figure 1:
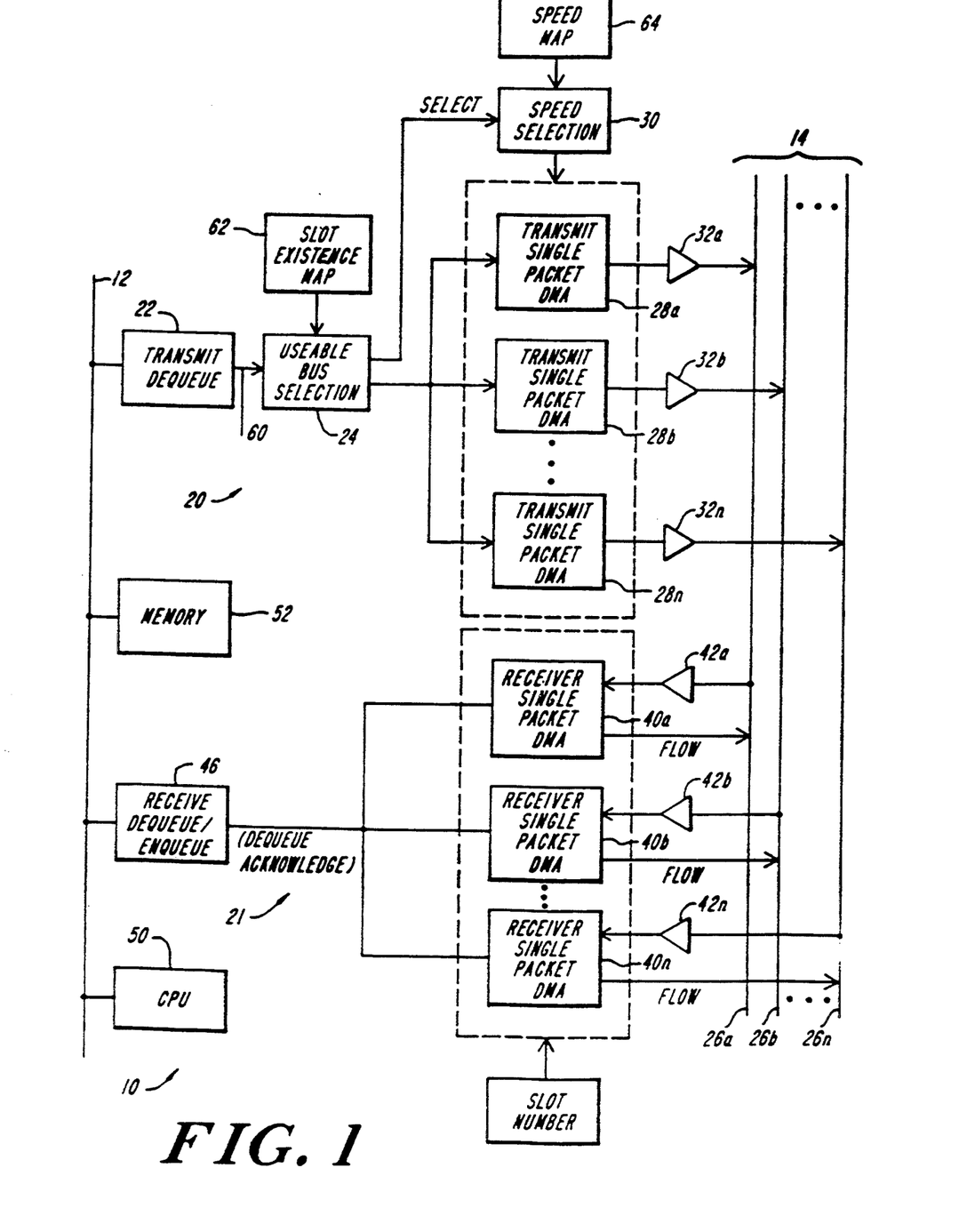
FIG. 1 is a block diagram of a transmitter circuitry in accordance with a preferred embodiment of the invention.

Referring to FIG. 1, in accordance with the invention, a transmitter/receiver apparatus 10 passes data between a memory bus 12 and a wide bus 14 which can be, for example, a standard wide bus, thirty-two data bits in width, such as a computer internal backbone. Preferably, the bus has, also, a plurality of control lines. A transmitter section 20 and a receiver section 21 of each node are connected to one such memory bus or its equivalent. Also connected to the memory bus are a CPU 50 and a memory storage element 52.

The transmitter section 20 of the apparatus has a transmitter dequeue circuitry 22 which receives data to be transmitted over bus 14 from the memory bus 12. The data includes destination data and information data to be used at the destination node or nodes. The transmitter dequeue circuitry makes the destination data available to a bus selection apparatus 24 which selects which of a plurality of sub-buses (26a, 26b, . . . 26n) of bus 14 will be employed in connection with the transmission of this data. Once the selection has been made, the data is delivered to a connected single packet DMA transmission circuitry (28a, 28b, . . . 28n) for each selected sub-bus and which operates at a speed selected by a speed selection circuitry 30. The output of the single packet DMA circuitry is passed to a connected driver (32a, 32b, . . . 32n) for transmission to the respective sub-bus.

Figure 1A:
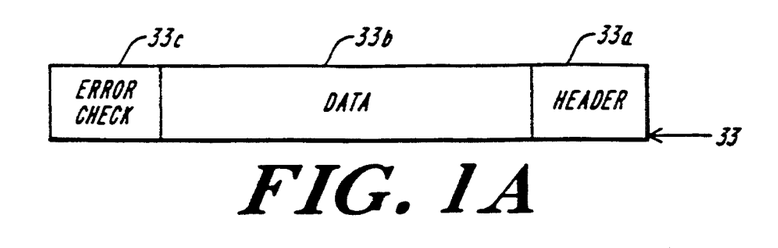
FIG. 1A is a diagram of a data packet.

Information is transmitted over the sub-bus 26 in a data packet 33; and each packet has a header 33a, which includes destination node identification information and other protocol information if necessary, a data portion 33b and an error checking portion 33c (FIG. 1A). Each network node, connected to bus 14, is connected to one or more of the sub-buses 26. Each receiving (destination) node examines each of the packets available to it, over each of the sub-buses to which it is connected, using a single packet DMA receiver circuitry (40a, 40b, . . . 40n). Each receiver circuitry 40 receives the data packet from the sub-bus through a respective receiver driver (42a, 42b . . . 42n). An output of the packet DMA receiver circuitries is delivered to a receiver dequeue-/enqueue circuitry 46 and data packets can be stored in selected buffers as described in more detail below.

Figure 1B:
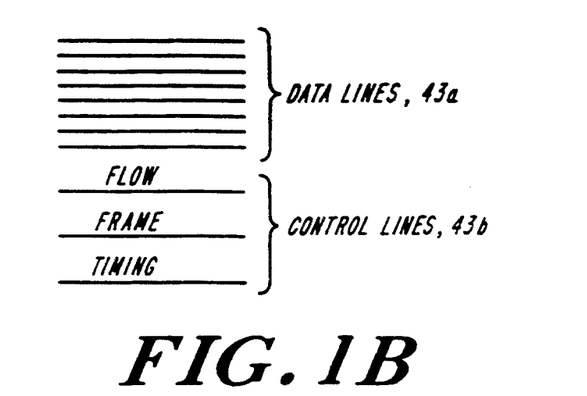
FIG. 1B is a representation of the lines of a sub-bus in accordance with the invention.

The sub-buses (26a, 26b . . . 26n) together include all of the lines of bus 14. In a typical example, bus 14 is a 32-bit wide bus which is divided into four 8-bit wide sub-buses. Each sub-bus has both data lines 43a and control lines 43b (FIG. 1B). The bus 14 can operate, over its entire width, at, for example, 100 megabits per second, and correspondingly, each sub-bus operates at 25 megabits per second. Accordingly, since each node will transmit data to a specific destination node on only one sub-bus in accordance with the invention, the node operates at the slower speed of 25 megabits per second. Thus, for example, where there are memory accesses across a 32-bit word, there need only be one memory access along bus 12 for each four "subword" transmissions along an eight wide bit sub-bus 26 of bus 14. Accordingly, only one memory access is required for each group of subwords and the memory access circuitry for each node need operate at only a fraction of the speed at which a node transmitting across the entire width of bus 14, each clock cycle, would be required to operate. At the same time, however, the operation of a plurality of nodes, on the different sub-buses of bus 14, enables the bus 14 to operate efficiently at its full capacity. In this manner, the cost of memory at each node can be substantially reduced because the access time required of each memory can be greater than that otherwise associated with and required by the full bus 14. On the other hand, when all sub-buses are operating, the data transmission rate on bus 14 appears to be at the full capacity of bus 14.

In a preferred embodiment of the invention, the sub-buses need not operate in a synchronized manner. However, in accordance with the described embodiment of the invention, there are also provided three control lines for each sub-bus, to be described below, to further enhance operation of the bus system.

Figure 1C:
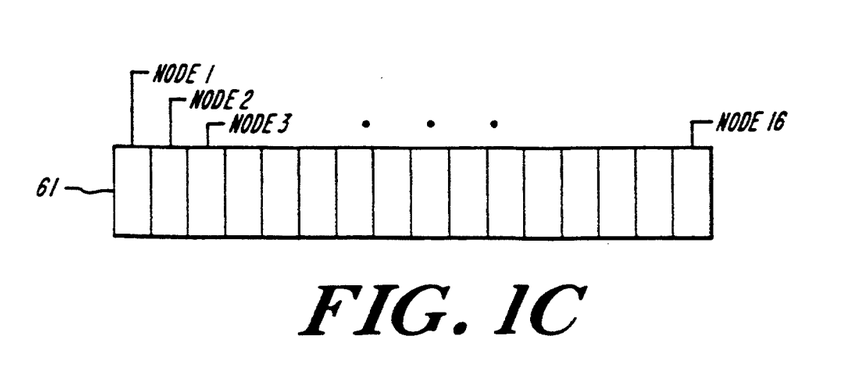
FIG. 1C is a representation of a slot mask in accordance with the invention.

Considering the circuitry of FIG. 1 in more detail, the transmit dequeue circuitry 22 dequeues a packet provided from the CPU or, under the control of the CPU, from memory, and makes the destination address data available to the bus selection circuitry 24 over lines 60. The destination data is made available as a "slot mask" 61, at the bus selection circuitry 24. The slot mask (FIG. 1C) is a two byte word, in the illustrated embodiment, wherein a "one" bit represents a destination ("slot") address for the packet. A packet can have multiple destinations, in which case the slot mask has multiple bits set, each bit (of the two byte mask in the illustrated embodiment) representing a different destination. The slot mask is compared to existence maps in a slot existence map (a data map array) circuitry 62. The slot existence map indicates, for each destination node, which sub-buses can be used for the transfer of data between nodes.

Thus, the slot mask provides a bit position for each of the nodes connected to bus 14 (FIG. 1C); and for each sub-bus, the existence of a set bit in the existence map for that sub-bus indicates a receiver connection of that node to the sub-bus, while the absence of a set bit indicates the absence of an interface connection, for that destination node, to the sub-bus. As a result of the comparison, there are typically one or more sub-buses which can be used to transmit a data packet to the selected destination(s). From the set of available sub-buses provided by existence map circuitry 62, the bus selection circuitry 24 selects one sub-bus, at random in the illustrated embodiment, as the transmission carrier.

The bus selection circuitry also sends the packet destination slot mask to the speed selection circuitry 30. The speed selection circuitry 30 examines a stored speed map 64 to determine the maximum data rate at which the packet data can be sent to the selected destination(s). Thereafter, once the speed and the sub-bus have been determined, the information data is made available to the selected transmitter single packet DMA circuitry(s) and the data are sent over the sub-bus(es) by that transmit DMA circuitry(s) through its associated driver(s) 32 when control of the bus(es) has been made available to the associated transmit DMA (as described below). Thereafter the process is repeated for each successive packet to be transmitted.

In a particularly preferred embodiment of the invention, the CPU can designate a specific sub-bus to be employed in the transmission process thus bypassing the sub-bus selection circuitry 24 of the transmitter section.

At the receiver, each receiver single packet DMA circuitry 40 monitors all packets on its connected sub-bus. Whenever a packet is found to include the predetermined receiver slot number, specified by the destination slot mask in the packet header, a dequeue request is issued by the receiver circuitry 40 to the receiver dequeue/enqueue circuitry 46. The receiver dequeue-/enqueue logic circuitry 46 then obtains a buffer, which is available from a pool of free buffers provided by the CPU, and the address of the buffer is sent to the requesting receiver DMA circuitry 40. The receiver DMA circuitry then DMA's the received packet directly into the designated buffer of memory. If the packet is received error-free, the buffer is made available to the receiver dequeue/enqueue circuitry 46 and is placed in a receiver queue at the CPU. If an error is detected, the receiver dequeue/enqueue circuitry places the allocated buffer back in the so-called "free" pool and the resulting data is effectively lost, and in not made available to the CPU. The operating system protocol handles a request for retransmittal of the packet.

In the operation of the circuitry of FIG. 1, several protocol rules are preferably observed for increasing the operational efficiency and hence throughput of the circuitry. First, all transmissions start at the highest speed at which all nodes connected to a sub-bus will correctly process the received information. Thus, all header information is transmitted at a speed which enables each node connected to the sub-bus to determine whether it is the intended destination of the packet. Once the header information has been transmitted, the transmission speed can be increased if and only if all destination nodes can read, as indicated by the speed selection circuitry 30, information transmitted at the higher rate. In the event that more than one destination node is specified, that is, if the header information indicates a plurality of receivers are receiving a packet (as noted above, this can be easily implemented by setting the appropriate slot bits in the slot masks for the plural nodes), then the maximum speed at which the information can be sent over the sub-bus is the highest speed at which all receivers can receive and properly process the information.

Once the data containing body of the packet has been transmitted, the transmitter, in the illustrated embodiment, sends an error check code which is processed by each of those receivers which were selected as destinations for the data. In the illustrated embodiment, since the error checking process is extremely complex and accordingly slow (at the receiver processing level), the transmitter slows the transmission rate to a low speed transmission which provides each receiver with adequate time to perform the necessary error checking process without an undue storage requirement at the receiving node.

Figure 2:
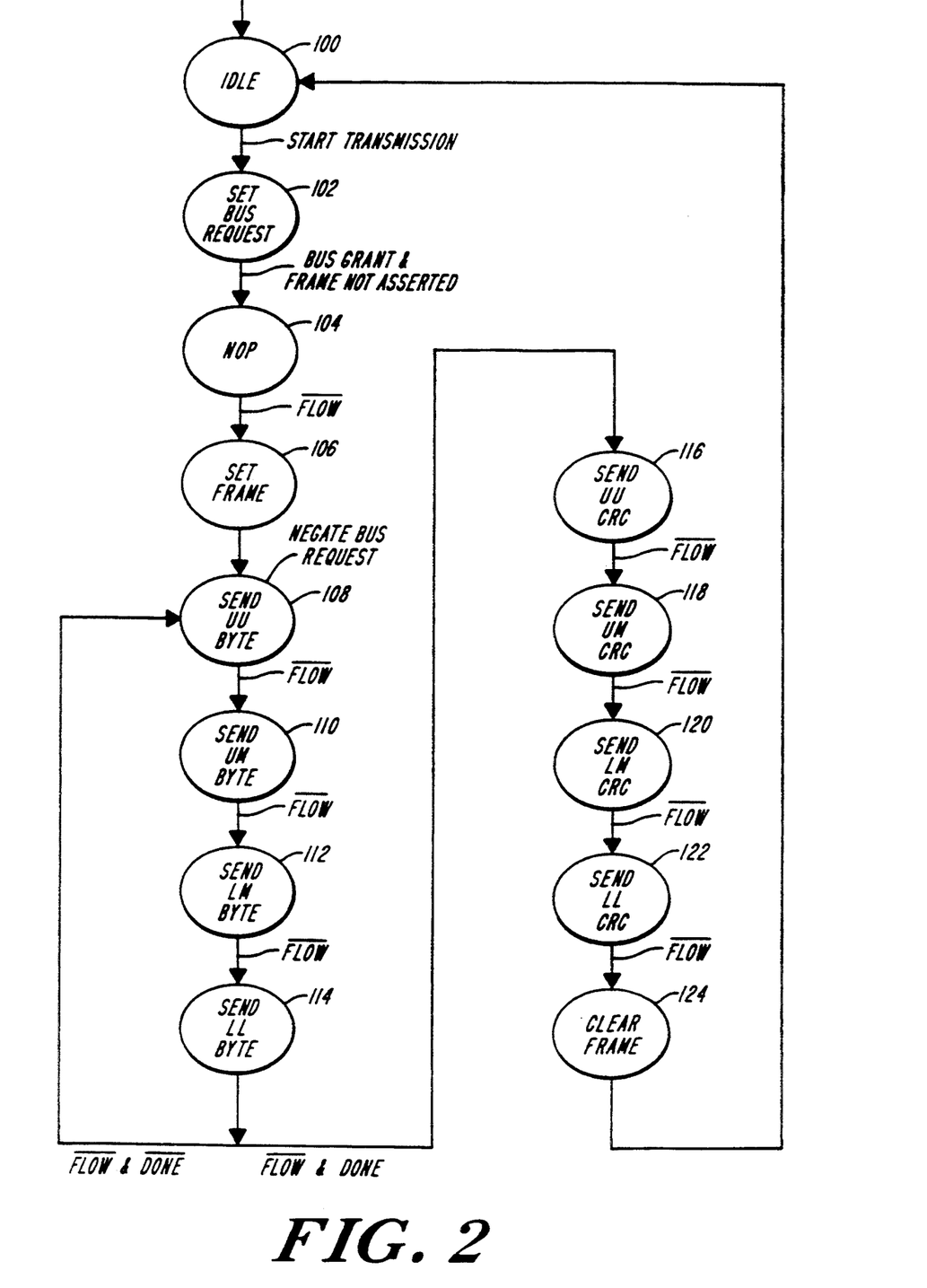
FIG. 2 is a state diagram for the transmitter node in accordance with the invention.

Referring to the transmitter state diagram of FIG. 2, for an embodiment in which bus 14 is thirty-two bits wide with twelve control lines, and each sub-bus is eight bits wide with three control lines, the transmitter requires four clock cycles of the bus to send a thirty-two bit wide word. The transmitter, when it initiates operation, thus resides in state 100, in which it is IDLE. Upon the beginning of a packet transmission, the transmitter sets a bus request; enters state 102 at which it checks to see that the BUS GRANT signal (a sub-bus control line) is not asserted and that the FRAME signal (a sub-bus control line) also is not asserted (refer to FIGS. 6 and 7 for timing diagrams of the bus operation and bus arbitration according to a preferred embodiment of the invention).

The transmitter then proceeds to a no operation (NOP) state 104. Thereafter the BUS REQ signal is asserted and thereafter the BUS GRANT is asserted. The FRAME signal is set in state 106 if the FLOW control signal over lines 109 (FIG. 3) (a warning bus control signal connected to all nodes) is not asserted, and the first, upper byte of the first word to be sent is transmitted at state 108. If the FLOW control signal remains not asserted, a second upper byte of the word is transmitted at state 110, a third byte at state 112, and a fourth and last byte of the thirty-two bit word is transmitted at state 114. Thereafter, if the FLOW control signal is still not asserted and the data packet is not complete as indicated by a "NOT DONE" signal on an internal control line 115, the transmitter cycles back to send the beginning of the next thirty-two bit word of the packet at state 108. If the FLOW signal is not asserted and the packet data transmission is complete (DONE is asserted), the transmitter begins to send the first byte of the error correction code as indicated at state 116. Thereafter the successive bytes of the thirty-two bit error correction code are sent at states 118, 120, and 122. Finally, the FRAME signal is cleared (reset) at state 124 and the transmitter returns to its IDLE state 100.

Figure 3:
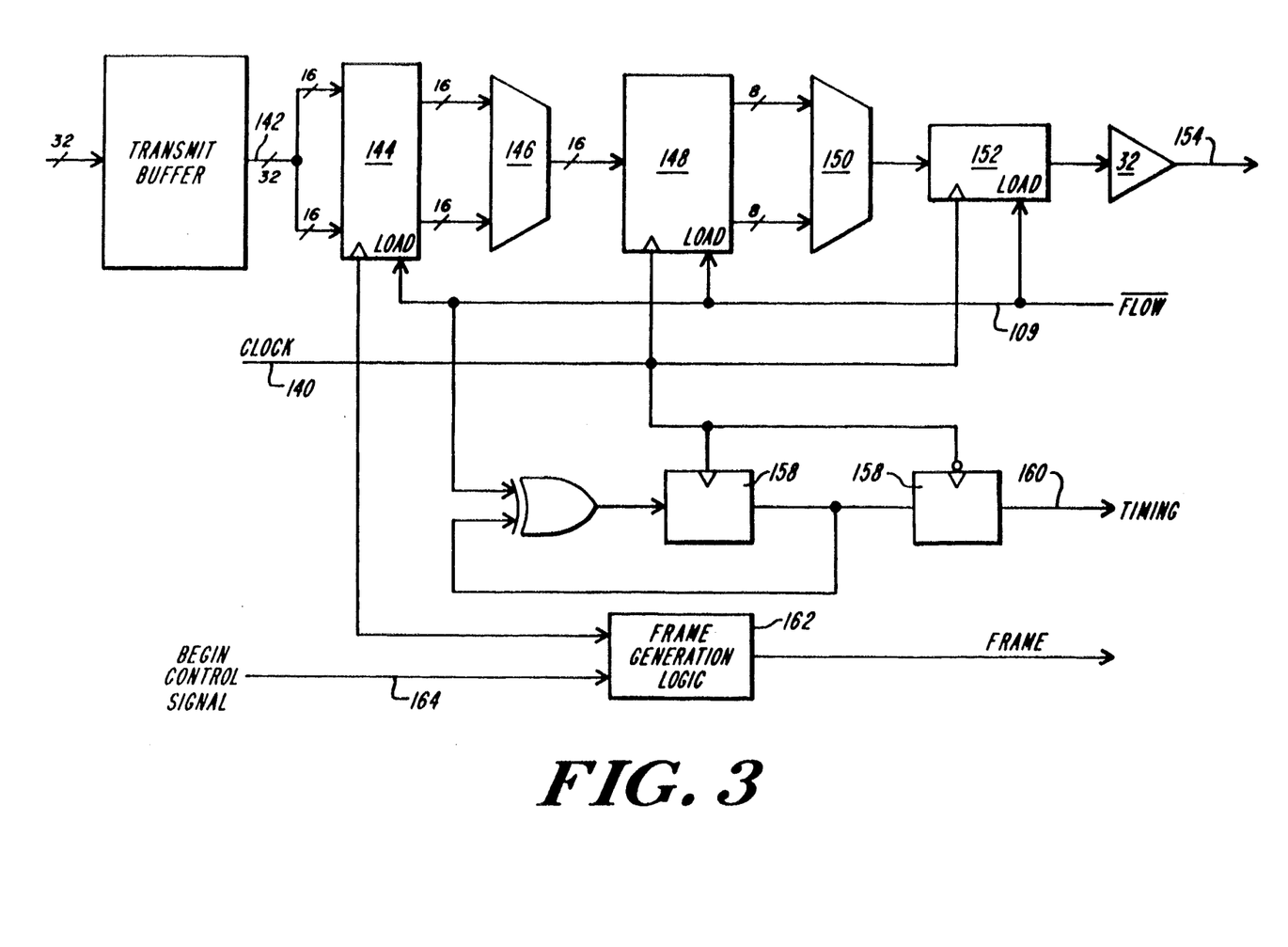
FIG. 3 is a detailed diagram of the transmitter data path circuitry.

Referring to FIG. 3, a typical transmitter structure receives the data over data lines 142 and synchronous with a clock signal over a sub-bus control line 140. The data passes through a thirty-two bit latch 144 which latches the data at each fourth clock time so long as the FLOW signal is not enabled. The output of latch 144 is input to a multiplexer 146 which, in response to the clock signals, passes one or the other of the high and low order sixteen bits of the stored thirty-two bit data word. The sixteen bit output of multiplexor 146 is held in a latch 148, controlled in the same manner as latch 144, and the two eight-bit outputs of latch 148 (high and low) are sequentially made available through multiplexer 150 to a third latch 152. The output of the third latch is made available to a sub-bus over a line 154 through a driver 32.

Timing for the transmitter data path is generated through the EXCLUSIVE-OR gate 156, and bistable flip flops 158. So long as the FLOW signal is not enabled, this circuitry divides by two with an output level change on line 160 every clock cycle, and shifted by one-half of a clock cycle to allow setting of the output data at the output of latch 152. The transmitter circuitry also includes a FRAME signal generation logic 162, responsive to the clock signal 140 and an initialization signal over a line 164 from the CPU for generating the FRAME control signal.

Figure 4:
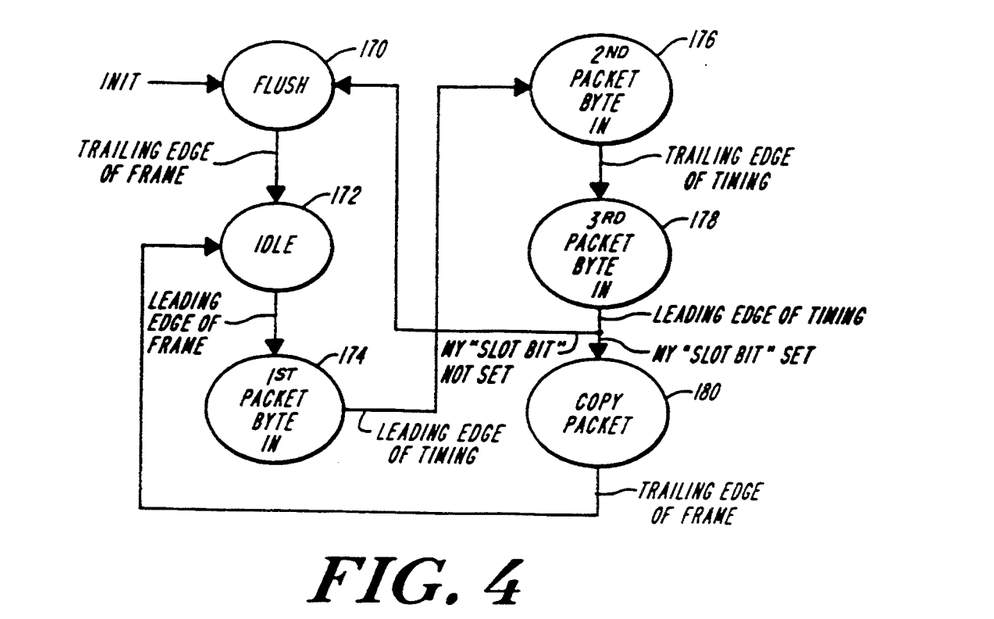
FIG. 4 is a state diagram of the receiver node in accordance with a preferred embodiment of the invention.
Figure 5:
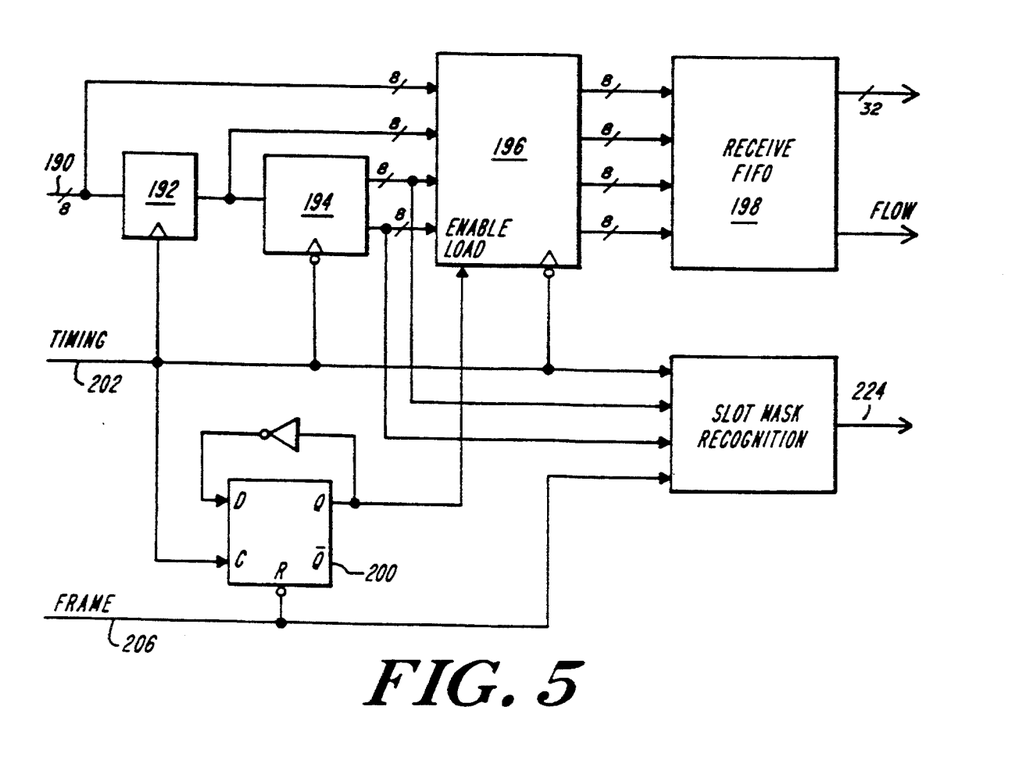
FIG. 5 is a circuit configuration for a receiver input data path in accordance with a preferred embodiment of the invention.

Referring now to FIG. 4, the receiver state diagram describes the operation of a receiver such as that illustrated schematically in FIG. 5. At the receiver, the start or initiation of operation begins at a FLUSH state 170. On the trailing edge of the FRAME signal, the receiver changes to a state 172 waiting there for the leading edge of the next FRAME signal. When the leading edge of the FRAME signal occurs (indicating the beginning of the next data packet), the receiver receives the first eight-bit byte from the channel over the sub-bus at state 174. For each successive level change of the timing signal, the receiver advances to a next state 176, 178, and either 180 or 170, as it reads each successive byte. After state 178, upon the next leading of the timing signal, the receiver either returns to the FLUSH state 170 which indicates that the packet slot bit was not set for that receiver and the packet should be ignored, or the receiver steps to state 180 because it recognizes that it is a destination for the incoming packet. At state 180, the receiver receives the entire packet and the end of the packet is indicated by the trailing edge of the FRAME signal, at which time, the receiver returns its normal IDLE state, state 172.

Referring to FIG. 5, a typical receiver data path provides for receiving eight bit wide data over lines 190. The eight bit data bytes pass through latches 192, 194 and 196 so that as each additional eight bits is received, the full thirty-two bit word is built up and is eventually stored in the latch 196 from which it is stored in a fifo buffer 198. The timing information is generated from the clock signal placed on the clock control line of the sub-bus by the transmitting node. Thus a level change occurs synchronously with the incoming data bytes and at the rate of the data byte transmission. At the first leading edge of the timing signal the first byte of a data word is stored in latch 192. At the following trailing edge of the timing pulse, that first byte of data is stored in the lower order eight bits of latch 194, and the second byte of data, available from lines 190, is stored in the upper eight bits of latch 194. Latch 196 does not operate because the enabling load signal from a flipflop 200 is not yet available. (Flipflop 200 in effect acts like a divide-by-two counter and accordingly enables a trailing edge of the timing signal only for every other trailing edge, corresponding to every fourth incoming data byte).

Upon the occurrence of the next leading edge of the timing signal on line 202, latch 192 again loads data into its register. This is the third byte of data in a four byte word. Upon the occurrence of the next trailing edge, latch 196 will operate, loading the two bytes of data from latch 194 into its lower half, and the upper two bytes of data from the output of latch 192 and the data lines 190 into its upper half. The full word is then made available to the receiver fifo buffer 198.

The operation of the circuitry associated with flipflop 200, which is enabled by the FRAME signal, is well known as a divide-by-two register. Accordingly, its operation in causing latch 196 to load only on every other trailing edge is well known to those of ordinary skill in the art.

In addition, the logic of the receiver FIFO buffer 198, asserts the FLOW signal to prevent the FIFO buffer from overflowing in the event that the receiver FIFO buffer 198 is getting too full. Separately, an error (interrupt) line (not shown) is asserted if a CRC error occurs. A slot recognition circuit 222 is responsive to the output of latch 194, the timing signal, and the FRAME signal for recognizing, by a signal over a line 224 that the incoming packet is intended for this node.

Figure 6:
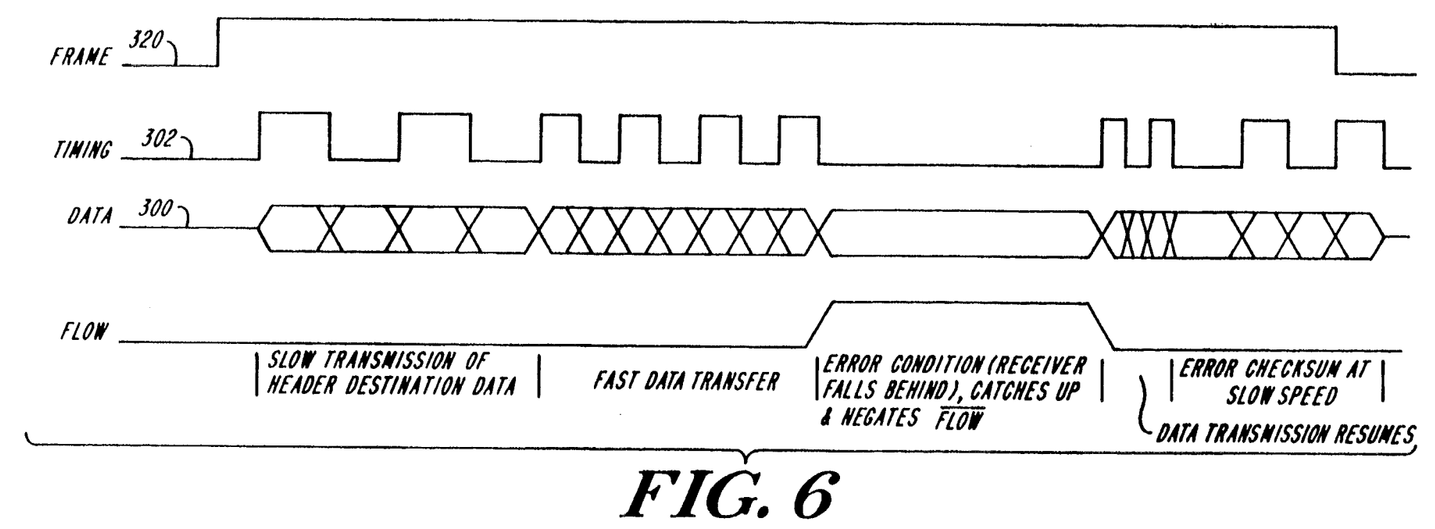
FIG. 6 is a timing diagram for data transmission on the sub-bus.
Figure 7:
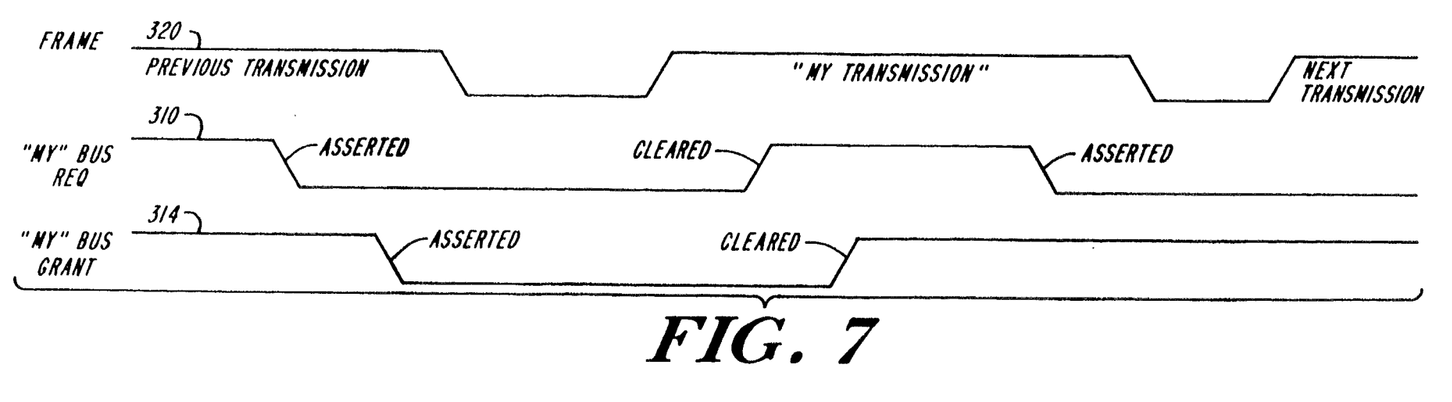
FIG. 7 is a timing diagram illustrating a particular bus arbitration strategy in accordance with invention.

Referring now to FIGS. 6 and 7, the timing of the control signals available over the sub-bus was described generally in connection with the hardware of the transmitter and receiver circuitries. Once a transmitter has obtained access to the bus, it asserts the FRAME signal over line 206 which then "alerts" each of the connected receivers that a new data packet is forthcoming. The timing signals, applied at a slow rate with regard to the header, are applied to the clock control line 160 of the bus and provides the timing for the received signal over line 202. As shown on the data line 300 of FIG. 6, the initial data (the header) is provided at a relatively slow rate, the intermediate data information is provided at a fast rate, and the error control, (the CRC checksum in the illustrated embodiment) is provided at a slow rate. The timing signal, line 302, corresponds to the clock rate as described above. If, at any time, the receiver falls behind, the receiver asserts the FLOW line 304 which causes the transmitter to stop transmission. If the FLOW line is asserted for less than a predetermined time, (corresponding to the receiver "catching up"), the receiver can negate the FLOW assertion and the transmitter will then continue to transmit data. (If the transmitter detects a FLOW assertion for more than this minimum period of time, the transmitter will ignore the FLOW signal and may thus overrun the receiver input FIFO buffer 198. If the receiver detects this buffer state, an overflow error occurs at the receiver.)

Referring now to FIG. 7, the bus arbitration strategy for the illustrated embodiment of the invention provides that a transmitter, which has information to transmit, asserts a BUS REQ signal 310 to a bus arbitration circuitry (not shown). Each node is connected directly to the arbitration circuitry in the illustrated embodiment, by two signal lines, a BUS REQ line and a BUS GRANT line. During an ongoing packet transmission, the bus arbitration circuitry examines the BUS REQ lines from all nodes and selects one requesting node at random, in this illustrated embodiment, and asserts a BUS GRANT line 314 to that node. The BUS GRANT signal will enable the transmitter to raise the FRAME signal 320 (after that control signal is lowered by the presently transmitting node, as illustrated in FIG. 7) and proceed to transmit data. During transmission, the BUS REQ signal is cleared by the transmitting node (as illustrated at 108 in FIG. 2), and accordingly the BUS GRANT signal to the node is also cleared to its unasserted state. A next BUS REQ signal is then acknowledged by the arbitration circuitry.

In accordance with this particular embodiment of the invention, a data transfer mechanism is used wherein the data bus is divided into a plurality of independent sub-buses and each sub-bus operates "on its own" at all times. Each sub-bus, however, can act to "cover" for a failed sub-bus thus enabling, if the node has the appropriate connection, reliable communications to be achieved even when part of the bus channel is inoperative. Normally, however, all buses operate, and the memory access time requirements are minimized, enabling less expensive memory to be employed even though the full bus operates at a substantially higher transfer rate.

Additions, subtractions, deletions, and other modifications of the invention will be apparent to those practiced in the art, and are within the scope of the following claims.

What is claimed is:

1. A method for transmitting data between a plurality of nodes of a communications network, each node having a maximum speed for receiving data words, said plurality of nodes connected on a communication bus having a bus width at least equal to a data word within a data packet and comprising a plurality of bus subsets of bus lines connecting the plurality of nodes, each bus subset comprising at least two bus lines, each node being directly connected to every bus line of every bus subset, the plurality of bus subsets in aggregate comprising the communication bus, the method comprising the steps of     determining, at a transmitting node, at least one of said plurality of bus subsets over which the transmitting node can communicate with an intended destination node receiving said data,     selecting, at the transmitting node, a speed at which to send said data words, within a range of the maximum speeds which said nodes can receive data words, based on a highest maximum speed at which only nodes acceptably determined to communicate with said transmitting node can receive said data words,     sending each data word within said data packet as a sequence of multibit subwords over said at least one of said plurality of bus subsets selected from said plurality of bus subsets acceptably determined to communicate with said transmitting node, and     said destination node, sending over a bus subset control line, during a data transmission of said data packet, a warning signal for informing the transmitting node of an overflow condition at the destination node.

2. The method of claim 1 further comprising the steps of appending as a header to said data words, a sequence of destination node identification symbols, and     appending, at the end of said sequence of data words error checking information data, said destination node, using the error information data to determine that said data words are received without error.

3. The method of claim 2 further comprising the step of sending said error checking information data at a bus speed slower than the highest maximum speed at which the data words are sent, said error checking information readable by all nodes connected to the selected bus subset.

4. The method of claim 2 further comprising the steps of forming a multibyte word for inclusion in said header, each node connected to a bus subset corresponding to a selected bit of said multibyte word, and     setting, at the transmitter, at least one bit of said multibyte word, for designating destination nodes for receiving a data packet to be transmitted.

5. The method of claim 1 further comprising the steps of stopping transmission of said data packet upon receipt of said warning signal, and     restarting transmission of said stopped data packet when a warning signal is removed from said overflow control line within a predetermined period of time.

6. The method of claim 1 further comprising the step of said destination node, sending over a bus subset control line, during a data transmission of said data packet, a warning signal for informing the transmitting node of an overflow condition at the destination node.

7. The method of claim 1 further comprising the step of sending all header information at a bus speed slower than the highest maximum speed at which the data words are sent, said header information readable by all nodes connected to a selected bus subset.

8. The method of claim 1 wherein said sending step further comprises the step of     randomly selecting, from those acceptably determined bus subsets, the bus subset to be used for transmitting said data.

9. The method of claim 1 wherein each node transmits data to said intended destination node over at least two subsets of said bus lines.

10. The method of claim 1 wherein said transmitting node communicates with a plurality of destination nodes over the selected bus subset.

11. The method of claim 1 wherein said transmitting node communicates with a plurality of destination nodes, each communication over different bus subsets.

12. The method of claim 1 wherein one of said plurality of bus subsets is substituted for an inoperative one of said plurality of bus subsets.

13. Apparatus for transmitting data between a plurality of nodes of a communications network, each node having a maximum speed for receiving data words, said plurality of nodes connected on a communication bus, said bus having a bus width at least equal to a data word within a data packet, comprising     a plurality of bus subsets of bus lines, said bus subsets in aggregate comprising the communication bus and each bus subset comprising at least two bus lines, each node being directly connected to every bus line of every bus subset,     means for determining, at a transmitting node, at least one of said plurality of bus subsets over which the transmitting node can communicate with an intended destination node receiving said data,     means for selecting, at the transmitting node, a speed at which to send said data words, within a range of the maximum speeds which said nodes can receive data words, based on a highest maximum speed at which only nodes acceptably determined to communicate with said transmitting node can receive said data words, and     means for sending each data word within said data packet as a sequence of multibit subwords over said at least one of said bus subsets selected from said plurality of bus subsets acceptably determined to communicate with said transmitting node, and     means for sending, from the destination node during a data transmission of said data packet, a warning signal over a bus subset control line, for informing the transmitting node of an overflow condition at the destination node.

14. The apparatus of claim 13 further comprising means for appending as a header to said data words, a sequence of destination node identification symbols, and     means for appending, at the end of said sequence of data words, error checking information data, a destination node, using the error information data to determine that said data words are received without error.

15. The apparatus of claim 14 further comprising means for forming a multibyte word for inclusion in said header, each node connected to a bus subset corresponding to a selected bit of said multibyte word, and means for setting, at the transmitter, at least one bit of said multibyte word, for designating destination nodes for receiving a data packet to be transmitted.

16. The apparatus of claim 14 wherein said sending means further comprises means for randomly selecting, from those acceptable determined bus subsets, the bus subset to be used for transmitting said data.

17. The apparatus of claim 13 wherein said determining means comprises means for selecting at least two subsets of said bus lines to communicate with said intended destination node.

18. The apparatus of claim 13 further comprising means for sending, from the destination node during a data transmission of said data packet, a warning signal for informing the transmitting node of an overflow condition at the destination node.

19. The apparatus of claim 18 further comprising means for stopping transmission of said data packet upon receipt of said warning signal, and means for restarting transmission of said stopped data packet when said warning signal is removed from an overflow control line within a predetermined period of time.

20. The apparatus of claim 13 further comprising means for sending all header information at a bus speed slower than the highest maximum speed at which the data words are sent, said header information readable by all nodes connected to the bus subset.

21. The apparatus of claim 20 further comprising means for sending said error checking information data at said bus speed slower than the highest maximum speed at which the data words are sent, said error checking information readable by all nodes connected to the selected bus subset.

22. Apparatus for transmitting data between a plurality of nodes of a communications network, each node having a maximum speed for receiving data words, said plurality of nodes connected on a communication bus, said bus having a bus width at least equal to a data word within a data packet, comprising a plurality of bus subsets of bus lines, said bus subsets in aggregate comprising the communication bus and each bus subset comprising at least two bus lines including at least one control line and at least one data line, each node being directly connected to every bus line of every bus subset, bus selection circuitry connected within a transmitting node, to determine at least one of said plurality of bus subsets over which the transmitting node can communicate with an intended destination node receiving said data, said bus selection circuitry randomly selecting, from those acceptable determined bus subsets, at least one of the bus subsets to be used for transmitting said data, said data words comprising a header including a sequence of destination node identification symbols, and appended at the end of said sequence of data words, error checking information data, a destination node, using the error information data to determine that said data words are received without error, transmitter circuitry connected within said transmitting node, to send each data word as a sequence of subwords over the at least one data line of the bus subset selected from those acceptable determined bus subsets, overflow detection circuitry connected within said intended destination node to send, during a data transmission, a warning signal over the at least one control line of the bus subset selected for informing the transmitting node of an overflow condition at the destination node, said transmitter circuitry stopping transmission of said data packet upon receipt of said warning signal, and speed selection circuitry, connected within a transmitting node, for selecting a speed to send said data words, within a range of the maximum speeds which said nodes can receive data words based on a highest maximum speed at which all nodes acceptably determined to communicate with said transmitting node can receive said data words, said speed selection circuitry, sending all header information at a bus speed slower than the highest maximum speed at which the data words are sent, said header information readable by all nodes connected to the bus subset.

23. A method for transmitting data between a plurality of nodes of a communications network, each node having a maximum speed for receiving data words, said plurality of nodes connected to a communication bus having a bus width at least equal to a data word within the packet, and comprising a plurality of bus subsets of a plurality of bus lines, each bus subset including at least one control line and at least one data line, the plurality of bus subsets in aggregate comprising the communication bus, with each node being directly connected to every bus line of every bus subset, the method comprising the steps of determining, at a transmitting node, at least one of said plurality of bus subsets over which the transmitting node can communicate with an intended destination node receiving said data, randomly selecting, from those acceptable determined bus subsets, at least one of said bus subsets to be used for transmitting said data, appending as a header to said data words, a sequence of destination node identification symbols, appending, at the end of said sequence of data words, error checking information data, said intended destination node, using the error information data to determine that said data words are received without error, selecting, at the transmitting node, a speed at which to send said data words, within a range of the maximum speeds which said nodes can receive data words based on a highest maximum speed at which all nodes acceptably determined to communicate with said transmitting node can receive said data words, sending each data word within said data packet as a sequence of multibit subwords over the at least one data line of a bus subset selected from those acceptable determined bus subsets, sending over the at least one control line of a selected bus subset, from the destination node during a data transmission, an overflow error signal for informing the transmitting node of an overflow error condition at the destination node, sending all header information at a bus speed slower than the highest maximum speed at which the data words are sent, said header information readable by all nodes connected to the bus subset, stopping transmission of said data packet upon receipt of said overflow error signal, restarting transmission of said stopped data packet when said overflow signal is removed from an overflow control within a predetermined period of time.

* * * * *